United States Patent
Liu et al.

(10) Patent No.: US 9,959,447 B2
(45) Date of Patent: May 1, 2018

(54) FINGERPRINT RECOGNITION DEVICE, DISPLAY SCREEN AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Shengji Yang, Beijing (CN); Xiaoliang Ding, Beijing (CN); Weijie Zhao, Beijing (CN); Hongjuan Liu, Beijing (CN); Liguang Deng, Beijing (CN); Changfeng Li, Beijing (CN); Wei Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/034,618

(22) PCT Filed: Aug. 19, 2015

(86) PCT No.: PCT/CN2015/087514
§ 371 (c)(1),
(2) Date: May 5, 2016

(87) PCT Pub. No.: WO2016/173154
PCT Pub. Date: Nov. 3, 2016

(65) Prior Publication Data
US 2017/0103251 A1   Apr. 13, 2017

(30) Foreign Application Priority Data
Apr. 30, 2015   (CN) .......................... 2015 1 0219960

(51) Int. Cl.
*G06K 9/00* (2006.01)

(52) U.S. Cl.
CPC ....... *G06K 9/00087* (2013.01); *G06K 9/0002* (2013.01)

(58) Field of Classification Search
None
See application file for complete search history.

(56) References Cited

U.S. PATENT DOCUMENTS 6,960,788 B2 * 11/2005 Joo ..................... H01L 27/1214
257/401
2009/0160819 A1 * 6/2009 Sasaki ..................... B32B 27/00
345/174

(Continued)

FOREIGN PATENT DOCUMENTS

CN   102646004 A   8/2012
CN   103294306 A   9/2013

(Continued)

OTHER PUBLICATIONS

Office Action dated Feb. 26, 2016 issued in corresponding Chinese Application No. 201510219960.1.

(Continued)

*Primary Examiner* — Jayesh A Patel
(74) *Attorney, Agent, or Firm* — Nath, Goldberg & Meyer; Joshua B. Goldberg; Annie Kock

(57) ABSTRACT

The present invention provides a fingerprint recognition device, a display screen and a display device, which belong to the field of display technology and can solve the problem of high cost for conventional fingerprint recognition devices. The fingerprint recognition device of the present invention arranged at a light emitting side of a display panel includes a protection substrate, a glass base positioned under the protection substrate, a plurality of detecting electrodes formed on the glass base, capacitance being formed between (Continued)

the plurality of detecting electrodes and ridges or valleys of a fingerprint when touching occurs, and a control unit used to recognize the fingerprint based on the capacitance. The fingerprint recognition device of the present invention has a simple structure and a low cost.

9 Claims, 2 Drawing Sheets

(56) References Cited

U.S. PATENT DOCUMENTS

| | | | | | |
|---|---|---|---|---|---|
| 2009/0166411 | A1* | 7/2009 | Kramer | ............... | A61B 5/1172 235/382 |
| 2013/0083506 | A1* | 4/2013 | Wright | ............... | H04M 1/0202 361/807 |
| 2013/0135247 | A1* | 5/2013 | Na | ............... | G06F 21/32 345/174 |
| 2015/0036065 | A1* | 2/2015 | Yousefpor | ............... | G06K 9/228 349/12 |
| 2015/0071502 | A1* | 3/2015 | Breznicky | ............... | G06K 9/00885 382/115 |
| 2016/0026846 | A1* | 1/2016 | Lin | ............... | G06K 9/0002 382/124 |
| 2016/0188033 | A1* | 6/2016 | Lin | ............... | G06F 3/044 345/174 |

FOREIGN PATENT DOCUMENTS

| | | |
|---|---|---|
| CN | 103530609 A | 1/2014 |
| CN | 104036264 A | 9/2014 |
| CN | 104050466 A | 9/2014 |
| CN | 104794454 A | 7/2015 |
| KR | 20140046888 A | 4/2014 |

OTHER PUBLICATIONS

International Search report dated Jan. 29, 2016 issued in corresponding International Application No. PCT/CN2015/087514 along with an English translation of the Written Opinion of the International Searching Authority.
Office Action dated Nov. 25, 2015 issued in corresponding Chinese Application No. 201510219960.1.

* cited by examiner

FINGERPRINT RECOGNITION DEVICE, DISPLAY SCREEN AND DISPLAY DEVICE

This is a National Phase Application filed under 35 U.S.C. 371 as a national stage of PCT/CN2015/087514, filed Aug. 19, 2015, an application claiming the benefit of Chinese Application No. 201510219960.1, filed Apr. 30, 2015, the content of each of which is hereby incorporated by reference in its entirety.

FIELD OF THE INVENTION

The present invention belongs to the field of display technology, and specifically relates to a fingerprint recognition device, a display screen and a display device.

BACKGROUND OF THE INVENTION

Fingerprint is an inherent characteristic of a human body, which is innate and unique and can be used for distinguishing one person from others. It consists of a series of ridges and valleys on a skin surface of a fingertip. Generally, detailed compositions of these ridges and valleys include a ridge bifurcation, a ridge ending, an arch, a tented arch, a left whorl, aright whorl, a whorl, a twin loop or the like, by which the uniqueness of fingerprint patterns for each individual is determined. A fingerprint recognition technology, which is developed on the basis of the above, is used as a technology of personal identification earlier, and depending on various ways of collecting and inputting a fingerprint, widely-used and well-known technologies at present are classified into optical imaging, thermosensitive sensors, human infrared sensors and the like.

Fingerprint recognition devices are also widely applied to electronic products, such as the fingerprint recognition technology in Apple (trademark) mobile phones, FIGS. 1 and 2 illustrate an existing fingerprint recognition device 1, which includes a silicon (Si) base 11, a plurality of detecting electrodes 111 formed on the silicon base 11, a flexible printed circuit board (ITC) 13 electrically connected with the detecting electrodes 111 to provide driving signal(s) thereto, and a sapphire 12 formed on the plurality of detecting electrodes 111, wherein the sapphire 12 has an appropriate dielectric constant an as to have a large sensitivity and also protect the detecting electrodes 111. In the manufacture process of an entire machine, an opening needs to be formed in a protection glass 3 at a light-emitting side of a display panel 2, such that the fingerprint recognition device 1 is formed therein and exposed through the opening. In addition, in order to prevent the silicon base 11 from being damaged, an enhancement layer 14 is further arranged under the silicon base.

The inventors have found that at least the following problems exist in the prior art: in order to install the fingerprint recognition device 1, the protection glass 3 needs to be drilled, which makes the process complicated; the sapphire 12 needs to be used as a touch receiving device, which results in a high cost, and in addition, the detecting electrodes 111 are formed on the silicon base 11 which also has a high cost, thereby resulting in a high total cost of the fingerprint recognition device.

SUMMARY OF THE INVENTION

In view of the above problems existing in conventional fingerprint recognition devices, an object of the present invention is to provide a fingerprint recognition device having a simple structure and a low cost, a display screen and a display device.

The technical solution used for solving the technical problems in the present invention is a fingerprint recognition device, which includes a protection substrate, a glass base positioned under the protection substrate, a plurality of detecting electrodes formed on the glass base, capacitance being formed between the plurality of detecting electrodes and ridges or valleys of a fingerprint when touching occurs, and a control unit used to recognize the fingerprint based on the capacitance.

Preferably, the fingerprint recognition device further includes a matching unit, which is used to match the fingerprint recognized by the control unit with fingerprint data stored in a database.

Preferably, the fingerprint recognition device further includes a flexible printed circuit board, which is electrically connected with the detecting electrodes and is used to provide driving signal(s) to the plurality of detecting electrodes and to receive sensing signal of the plurality of detecting electrodes, so as to determine the occurrence of touching.

Preferably, the glass base has a thickness of 0.2 mm to 0.3 mm.

Preferably, the protection substrate is a glass plate.

The technical solution used for solving the technical problems in the present invention is a display screen, which includes a protection substrate and a display panel positioned under the protection substrate, wherein the display screen further includes a glass base positioned under the protection substrate, a plurality of detecting electrodes formed on the glass base, capacitance being formed between the plurality of detecting electrodes and ridges or valleys of a fingerprint when touching occurs, and a control unit used to recognize the fingerprint based on the capacitance.

Preferably, the display screen includes a display region and a non-display region surrounding the display region, wherein the glass base and the control unit are arranged in the non-display region.

More preferably, the display region of the display screen includes touch sensing electrodes arranged in the same layer and having the same material as the detecting electrodes, and touch driving electrodes arranged intersecting with the touch sensing electrodes; or, the display region of the display screen includes touch driving electrodes arranged in the same layer and having the same material as the detecting electrodes, and touch sensing electrodes arranged intersecting with the touch driving electrodes More preferably, the detecting electrodes include touch driving sub-electrodes and touch sensing sub-electrodes arranged intersecting with each other, and touch driving electrodes and touch sensing electrodes are arranged intersecting with each other in the display region of the display screen, wherein the touch driving sub-electrodes and the touch driving electrodes are arranged in the same layer and have the same material, and the touch sensing sub-electrodes and the touch sensing electrodes are arranged in the same layer and have the same material.

Preferably, the protection substrate is a glass plate.

More preferably, the protection glass has a thickness of 0.2 min to 0.3 min.

The technical solution used for solving the technical problems in the present invention is a display device, which includes the above display screen.

The beneficial effects of the present invention are as follows:

Since the fingerprint recognition device according to the present invention includes a glass base and the detecting electrodes are formed on the glass base, the cost of the fingerprint recognition device provided by the present invention is significantly reduced, compared with conventional fingerprint recognition devices having detecting electrodes formed on the silicon base. Moreover, a sapphire is not required in the fingerprint recognition device according to the present invention, which may cause not only the cost of the fingerprint recognition device to be further reduced, but also the manufacture procedure to be simplified so as to improve the production capacity.

Figure 1:
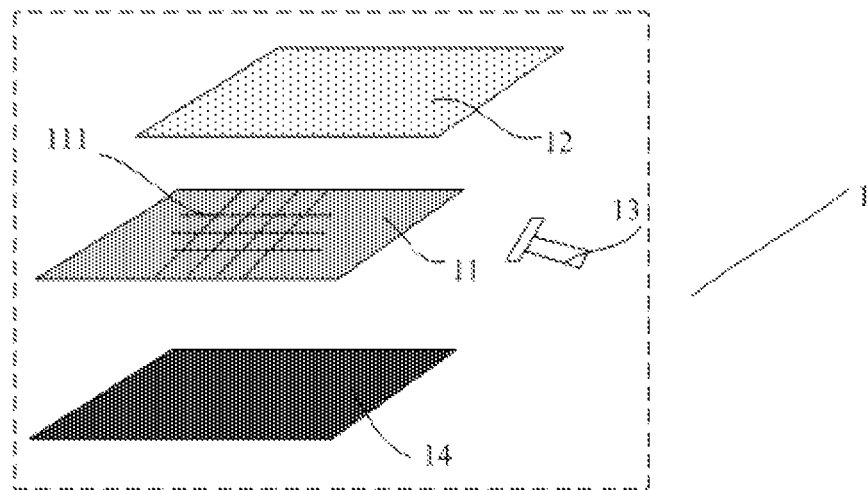
FIG. 1 is a schematic diagram of a conventional fingerprint recognition device.
Figure 2:
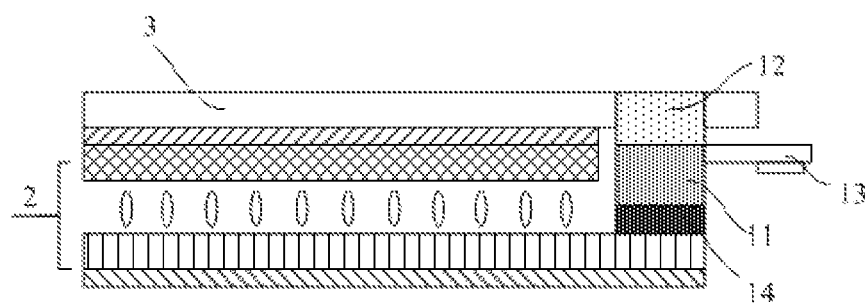
FIG. 2 is a schematic diagram of a conventional display device.

REFERENCE NUMERALS 1. fingerprint recognition device; 2. display panel; 3. protection glass; 11. silicon base; 111. detecting electrodes; 12. sapphire; 13. flexible printed circuit board; 14. enhancement layer; 15. glass base; 16. touch driving electrode; 17. touch sensing electrode; 18. touch driving sub-electrode; 19. touch sensing sub-electrode; 21. array substrate; 22. color filter substrate; 23. liquid crystal molecule; 24. lower polarizer; 25. upper polarizer.

DETAILED DESCRIPTION OF THE EMBODIMENTS

To make those skilled in the art better understand the technical solutions of the present invention, the present invention will be further described in detail below in conjunction with the accompanying drawings and specific implementations.

First Embodiment

Figure 3:
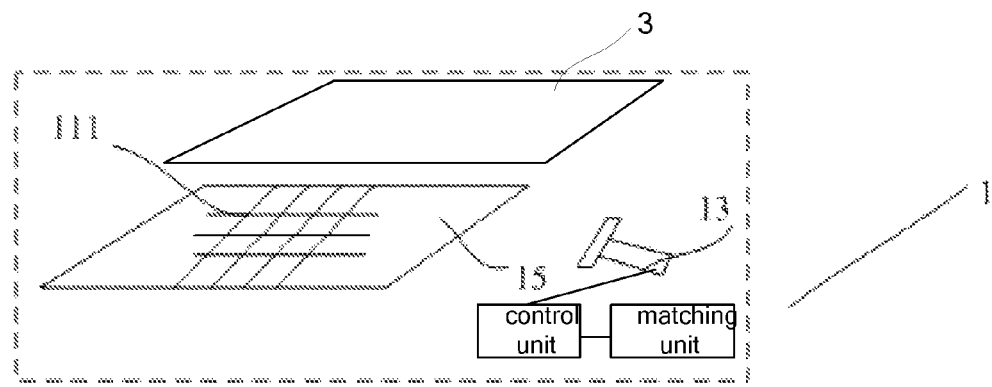
FIG. 3 is a schematic diagram of a fingerprint recognition device according to a first embodiment of the present invention.

FIG. 3 is a schematic diagram of a fingerprint recognition device according to the present embodiment. As illustrated in FIG. 3, the fingerprint recognition device 1 includes a protection glass 3, a glass base 15, a plurality of detecting electrodes 111 formed on the glass base 15, and a control unit (not shown). When a finger of human touches on the protection glass 3, capacitance is formed between the plurality of detecting electrodes 111 and ridges or valleys of the fingerprint, and the fingerprint is recognized by the control unit based on the capacitance.

Since the fingerprint recognition device 1 according to the present embodiment includes a glass base 15, and the detecting electrodes 111 are formed on the glass base 15, the cost of the fingerprint recognition device 1 according to the present embodiment is significantly decreased, compared with conventional fingerprint recognition devices having detecting electrodes formed on the silicon base. In addition, the fingerprint recognition device in the present embodiment needs no sapphire while using the protection glass 3 instead, which may cause not only the cost of the fingerprint recognition device to be further reduced, but also the manufacture procedure to be simplified an as to improve the production capacity.

Preferably, the fingerprint recognition device 1 may be applied to an electronic apparatus, such as a mobile phone, a tablet computer, a display device or the like, as a switch for turning on these electronic apparatuses. The fingerprint recognition device 1 is arranged at the front side of these electronic apparatuses, i.e., a side facing the user. Preferably, the fingerprint recognition device 1 according the present embodiment further includes a matching unit (not shown in figures), which is used to match the fingerprint recognized by the control unit with fingerprint data stored in a database.

Specifically, standard fingerprint data (that is, fingerprint data of one particular person) may be stored in the database of the matching unit in advance, and at this time, the matching is performed between the standard fingerprint data and the fingerprint recognized by the control unit. If the fingerprint matches with the standard fingerprint data, the matching of fingerprint is completed, and if the fingerprint does not match with the standard fingerprint data, it indicates that a faulty touching occurs, and it may also indicate that the user of the electronic apparatus having the fingerprint recognition device 1 is not the same person as the one whose fingerprint data is stored in the database in advance.

Preferably, the fingerprint recognition device 1 further includes a flexible printed circuit board 13, which is electrically connected to the detecting electrodes 111. The flexible printed circuit board 13 is used to provide a driving signal to the detecting electrodes 111 and receive a sensing signal of the detecting electrodes 111, so as to determine whether touching occurs to the fingerprint recognition device 1.

Preferably, in the present embodiment, the glass base 15 of the fingerprint recognition device 1 has a thickness of 0.2 mm to 0.3 mm to prevent an excessively large thickness of a display device to which the fingerprint recognition device 1 is applied.

Second Embodiment

The present embodiment provides a display screen, which includes a protection glass and a display panel positioned under the protection substrate, and the display screen further includes the fingerprint recognition device 1 according to the first embodiment, wherein the fingerprint recognition device 1 and the protection glass as well as the display panel are formed integrally, thereby simplifying the manufacture procedure of the display screen according to the present embodiment.

Figure 4:
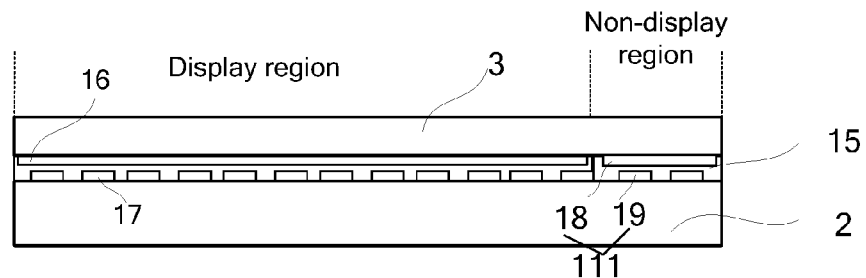
FIG. 4 is a schematic diagram of a display screen according to a second embodiment of the present invention.

Specifically, FIG. 4 illustrates a schematic diagram of a display screen according to the present embodiment. As shown in FIG. 4, the display screen in the present embodiment includes a protection glass 3 and a display panel 12 positioned under the protection substrate, and the display screen further includes a glass base 15 and a control unit (not shown), the glass base 15 is positioned under the protection substrate 3 and above the display panel 2, a plurality of detecting electrodes 111 are formed on the glass base 15. When a finger touching occurs, capacitance is formed between these detecting electrodes 111 and ridges or valleys of the fingerprint, and the fingerprint is recognized by the control unit based on the capacitance. In the present embodiment, a portion of the protection substrate 3, which is positioned above the glass base 15, the glass base 15 and the detecting electrodes 111 formed thereon, and the control unit not shown constitute the fingerprint recognition device 1 as illustrated in the first embodiment, and for convenience of description, it is still explained for the fingerprint recognition device 1 hereinafter, and other components of the fingerprint recognition device 1 are not shown.

More specifically, the display screen includes a display region and a non-display region surrounding the display region, and the fingerprint recognition device 1 is arranged in the non-display region.

As a preferable implementation of the present embodiment, the display region of the display screen includes touch sensing electrodes 17 arranged in the same layer and having the same material as the detecting electrodes 111, and touch driving electrodes 16 arranged intersecting with the touch sensing electrodes 17; alternatively, the display region of the display screen includes touch driving electrodes 16 arranged in the same layer and having the same material as the detecting electrodes 111, and touch sensing electrodes 17 arranged intersecting with the touch driving electrodes 16. In short, one of the touching electrode(s) and the sensing electrode(s) in the display region of the display screen has (have) the same material and are arranged in the same layer as the detecting electrodes 111, that is to say, one of the touching electrode(s) and the sensing electrode(s) may be formed by the same patterning process as the detecting electrodes 111, and thus the manufacture procedure is simple, thereby reducing the cost and improving the production capacity.

Of course, it is also feasible that both the touching electrodes and the sensing electrodes in the display screen in the present embodiment have the same material and are arranged in the same layer as the detecting electrodes 111, that is to say, the display screen is a plug-in touch display screen of a self-capacitance-type.

As another preferable implementation of the present embodiment, the detecting electrodes 111 include touch driving sub-electrodes 18 and touch sensing sub-electrodes 19 arranged intersecting with each other, and touch driving electrodes 16 and touch sensing electrodes 17 are arranged intersecting with each other in the display region of the display screen, wherein the touch driving sub-electrodes and the touch driving electrodes 16 are arranged in the same layer and have the same material, and the touch sensing sub-electrodes and the touch sensing electrodes 17 are arranged in the same layer and have the same material.

That is to say, the touch driving electrodes 16 and the touch sensing electrodes 17 in the display region of the present embodiment may form mutual capacitance, and the touch driving sub-electrodes and the touch sensing sub-electrodes in the non-display region may also form mutual capacitance, wherein the touch driving sub-electrodes and the touch driving electrodes 16 are arranged in the same layer and have the same material, and thus the same patterning process may be used to form both of the above; the touch sensing sub-electrodes and the touch sensing electrodes 17 are arranged in the same layer and have the same material, and thus the same patterning process may be used to form both of the above, such that the cost can be reduced and the production capacity can be improved.

Preferably, the protection glass 3 according to the present embodiment may be used to prevent the fingerprint recognition device 1 and the display panel 2 from being damaged.

Wherein, the above protection glass 3 has a thickness of 0.2 mm to 0.3 mm. The strength of the protection glass 3 as well as the sensitivity of the fingerprint recognition device 1 can be ensured by selecting the thickness of the protection glass 3 as ranging from 0.2 mm to 0.3 mm.

Third Embodiment

Figure 5:
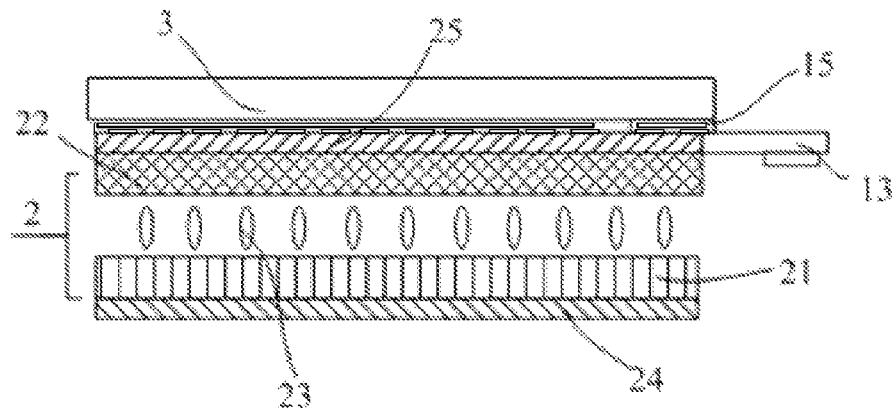
FIG. 5 is a schematic diagram of a display device according to a third embodiment of the present invention.

The present embodiment provides a display device. FIG. 5 illustrates a schematic diagram of a display device according to the present embodiment, and the display device includes the above display screen, a backlight component (not shown) and the like.

As illustrated in FIG. 5, the display screen in the second embodiment includes the fingerprint recognition device 1, which is arranged at the light emitting side of the display panel 2, wherein the display panel 2 may include an array substrate 21 and a color filter substrate 22 assembled and opposite to each other and liquid crystal molecules 23 formed between the array substrate 21 and the color filter substrate 22, A lower polarizer 24 and an upper polarizer 25 are arranged at the light incident side of the array substrate 21 and the light emitting side of the color filter substrate 22, respectively, while the fingerprint recognition device 1 is arranged at the light emitting side of the upper polarizer 25, and thereafter the protection glass 3 is covered on the fingerprint recognition device 1 directly without forming an opening on the protection glass 3 and exposing the fingerprint recognition device 1, thereby reducing the manufacture procedures and improving the production capacity.

The display device may be any product or component with the function of display, such as a mobile phone, a tablet computer, a television, a display, a not-book computer, a digital photo frame, a navigator or the like.

Apparently, the display device of the present embodiment may further include other common structures such as a power supply unit, a display driving unit and the like.

Although in the present embodiment, description is made by taking a liquid crystal display device as an example, the present invention may also be applied to other types of display device, such as (RED display device and the like.

It can be understood that the foregoing implementations are merely exemplary implementations used for describing the principle of the present invention, but the present invention is not limited thereto. Those of ordinary skill in the art may make various variations and improvements without departing from the spirit and essence of the present invention, and these variations and improvements shall fall into the protection scope of the present invention.

What is claimed is:

1. A display screen, comprising a protection substrate and a display panel positioned under the protection substrate, wherein the display screen further comprises:
   a glass base positioned under the protection substrate;
   a plurality of detecting electrodes formed on the glass base, capacitance being formed between the plurality of detecting electrodes and ridges or valleys of a fingerprint when touching occurs; and
   a control unit used to recognize the fingerprint based on the capacitance,
   wherein the display screen includes a display region and a non-display region surrounding the display region, and wherein the glass base and the control unit are arranged in the non-display region, and
   wherein the display region of the display screen includes touch sensing electrodes arranged in a same layer and having a same material as the plurality of detecting electrodes, and touch driving electrodes arranged intersecting with the touch sensing electrodes.

2. A display screen, comprising a protection substrate and a display panel positioned under the protection substrate, wherein the display screen further comprises:
  a glass base positioned under the protection substrate;
  a plurality of detecting electrodes formed on the glass base, capacitance being formed between the plurality of detecting electrodes and ridges or valleys of a fingerprint when touching occurs; and
  a control unit used to recognize the fingerprint based on the capacitance,
  wherein the display screen includes a display region and a non-display region surrounding the display region, and wherein the glass base and the control unit are arranged in the non-display region, and
  wherein the display region of the display screen includes touch driving electrodes arranged in a same layer and having a same material as the plurality of detecting electrodes, and touch sensing electrodes arranged intersecting with the touch driving electrodes.

3. The display screen according to claim 1, wherein the plurality of detecting electrodes include touch driving sub-electrodes and touch sensing sub-electrodes arranged intersecting with each other, and touch driving electrodes and touch sensing electrodes are arranged intersecting with each other in the display region of the display screen; and wherein the touch driving sub-electrodes and the touch driving electrodes are arranged in a same layer and have a same material, and the touch sensing sub-electrodes and the touch sensing electrodes are arranged in the same layer and have the same material.

4. The display screen according to claim 1, wherein the protection substrate is a glass plate.

5. The display screen according to claim 4, wherein the protection substrate has a thickness of 0.2 mm to 0.3 mm.

6. A display device, comprising the display screen according to claim 1.

7. A display device, comprising the display screen according to claim 2.

8. A display device, comprising the display screen according to claim 3.

9. A display device, comprising the display screen according to claim 4.

* * * * *